June 5, 1962  F. A. CHIUCHIOLO  3,038,141
PLUG-IN WALL RECEPTACLES
Filed June 28, 1960  4 Sheets-Sheet 2
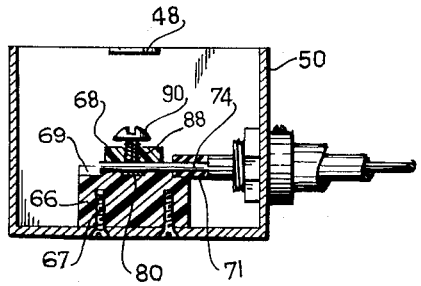
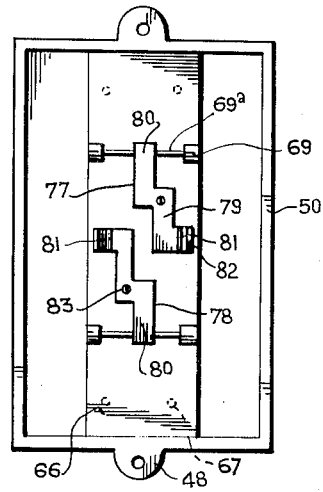
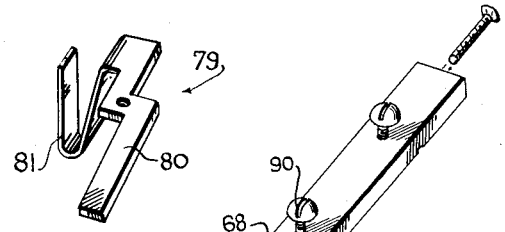
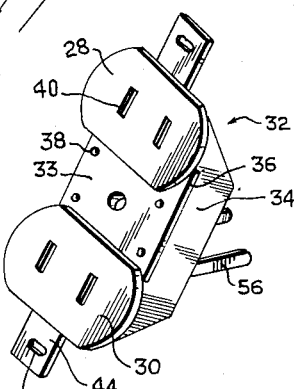
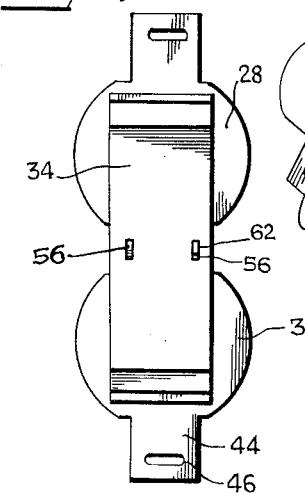
INVENTOR.
FRANK A. CHIUCHIOLO
BY
ATTORNEY

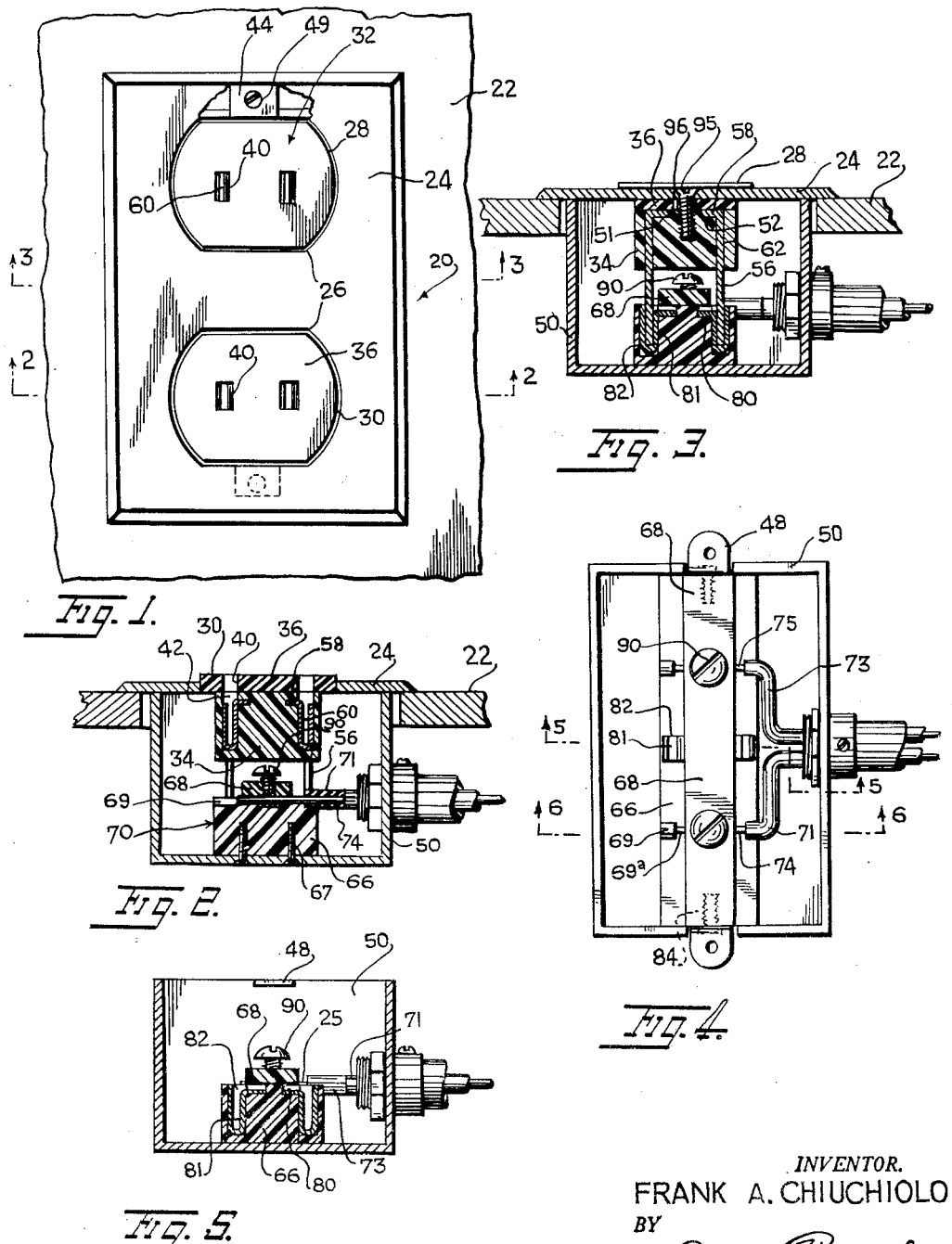

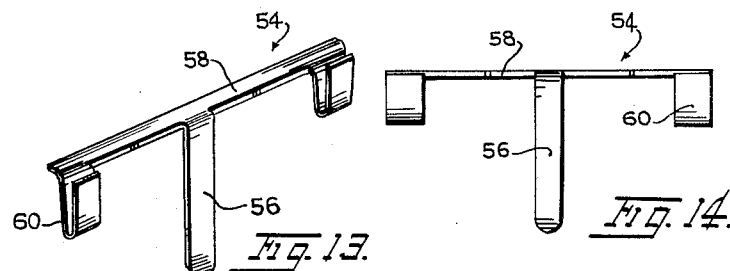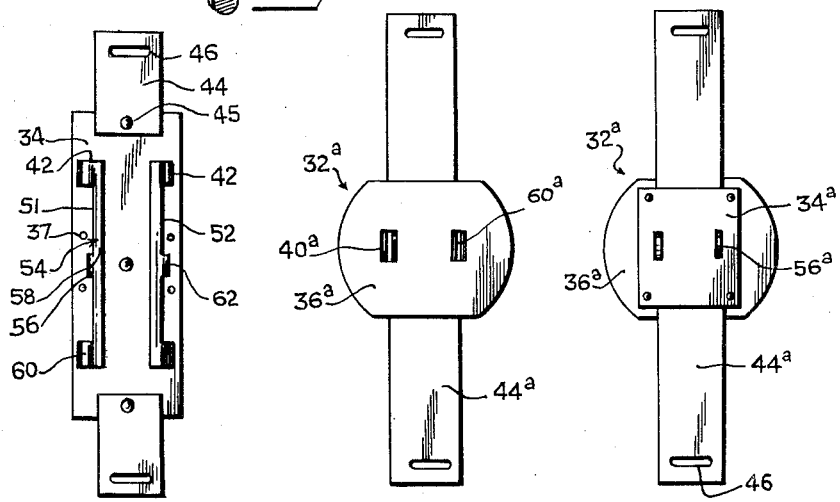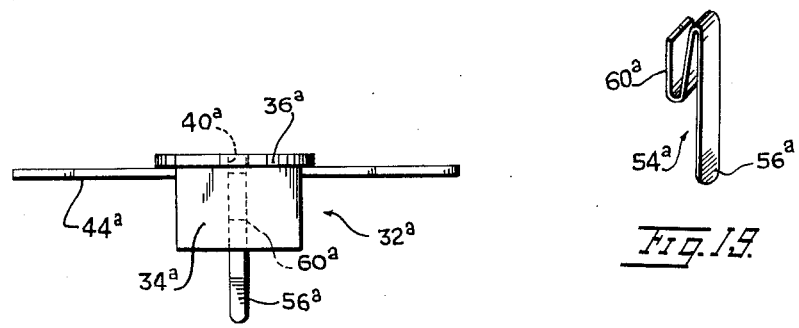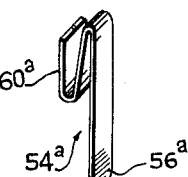

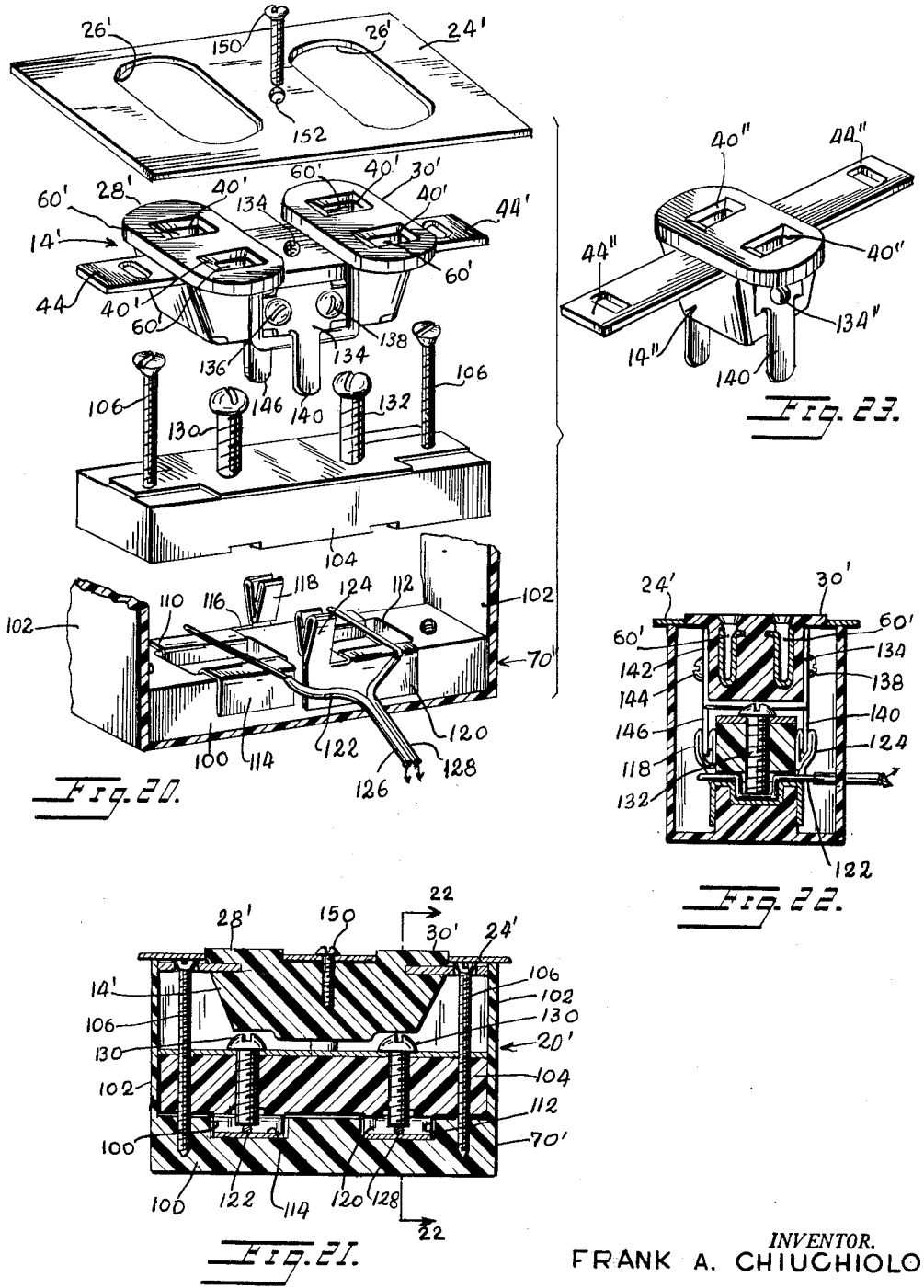

United States Patent Office 3,038,141
Patented June 5, 1962

3,038,141
PLUG-IN WALL RECEPTACLES
Frank A. Chiuchiolo, 78 Morton Blvd., Plainview, N.Y.
Filed June 28, 1960, Ser. No. 39,281
2 Claims. (Cl. 339—164)

This invention concerns an improved power outlet receptacle.

Heretofore it has been conventional to install a power outlet receptacle in an outlet box by connecting the power wires to the receptacle by means of screws provided thereon. If it became necessary to change the receptacle from a single to double outlet or vice versa, it was necessary to shut off the power before loosening the holding screws for the power wires. The new receptacle could then be installed in the outlet box. This change of receptacles, by law, generally required the services of a licensed electrician, and in addition required considerable skill and manual dexterity to bend and manipulate the heavy gauge power wires.

The present invention is directed at providing a power outlet plug-in socket which requires no particular skill or tools to install or change, and which can be changed without interrupting the power supply to the outlet box. Associated with the removable plug-in receptacle is a permanently installed power terminal receptacle adapted to receive plug-in sockets of various types.

It is therefore a principal object of the invention to provide a power outlet box with a permanently installed power terminal receptacle and with an associated removable plug-in socket receptacle for receiving plugs of electrical appliances.

A further object is to provide a two-part power terminal receptacle adapted to engage power wires therein and having means for receiving an appliance serving socket.

Another object is to provide a two-part power terminal receptacle having pressure means for engaging power wires to avoid the usual crimping and twisting required in conventional power outlet receptacles, the receptacle being adapted to receive a plug-in socket to be mounted on a power outlet box.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front elevational view of a power outlet receptacle embodying the invention, parts being broken away.

FIGS. 2 and 3 are sectional views taken on lines 2—2 and 3—3 of FIG. 1.

FIG. 4 is a front elevational view of an outlet box and power terminal receptacle, including pressure bar and power wires.

FIGS. 5 and 6 are sectional views taken on lines 5—5 and 6—6, respectively, of FIG. 4.

FIG. 7 is a front elevational view of the outlet box and power terminal receptacle, the pressure bar and power wires being omitted.

FIG. 8 is a perspective view of a contact element employed in the power terminal receptacle of FIG. 7.

FIG. 9 is a perspective view of the pressure bar.

FIG. 10 is a perspective view of a plug-in socket.

FIGS. 11 and 12 are side and rear views, respectively, of the plug-in socket of FIG. 10.

FIGS. 13 and 14 are perspective and side views, respectively, of a contact member employed in the plug-in socket.

FIG. 15 is a front elevational view of a base portion of the plug-in socket.

FIGS. 16, 17 and 18 are front, rear and side views, respectively, of another form of plug-in socket.

FIG. 19 is a perspective view of a contact member employed in the socket of FIGS. 16–18.

FIG. 20 is a spread perspective view of a power outlet receptacle embodying another modified form of the invention.

FIG. 21 is a view similar to FIG. 2 of the form of FIG. 20.

FIG. 22 is a vertical sectional view taken on the line 22—22 of FIG. 21.

FIG. 23 is a perspective view of still another modified form of plug-in socket.

Referring to FIGS. 1–15, there is shown a wall type of power outlet 20 mounted on a wall 22. The outlet includes a front cover plate 24 having openings 26 at which are exposed sections 28 and 30 of a plug-in socket 32. This socket, as best shown in FIGS. 2, 3, 10–12 and 15, has a generally rectangular base block 34 formed of insulation material such as plastic. Socket sections 28 and 30 are formed on a plate 36 secured to the base block by rivets 38 at a central recessed portion 33 of the plate 36. The rivets are inserted in holes 37 in the base; see FIG. 15. Elongated pairs of openings 40 in the plate are disposed in registration with recesses 42 in the base block; see FIG. 2. Bars 44 secured to base block by rivets 45 extend from opposite ends thereof. These bars have holes 46 to receive screws 49 by means of which the bars can be secured to lugs 48 extending from opposite ends of power outlet box 50; see FIGS. 1 and 4.

Inserted in elongated recesses 51, 52 in the base block 34 at the sides thereof (see FIG. 15) are two contact members 54. Each contact member, as best shown in FIGS. 13 and 14, has a prong 56 extending from the center of a flat conductive strip or bus bar 58. The ends of the strip are formed with bent, depending spring fingers constituting V-shaped contacts 60. The prongs of the two contact members extend through enlarged portions 62 of the recesses 51, 52 in the base block, which portions 62 extend through the block 34. The contact fingers are disposed within enlarged portions 42 of the recesses 51 and 52 at the ends thereof.

In order to removably receive the plug-in socket, there is provided a power terminal receptacle 70 within the box 50, as best shown in FIGS. 2–9, to which reference is now made. This receptacle includes a lower rectangular base member or block 66 and an upper pressure bar 68 both made of insulation material. The base member or block 66 extends longitudinally at the bottom of the box and is secured thereto by screws 67. Transverse grooves 69, 69a are formed in the block to receive power cables 71, 73 carrying conductors 74, 75. Grooves 69 receive the insulated wire and grooves 69a receive the bare wire. Recesses 77, 78 are formed in the base member to receive contact members 79, best shown in FIG. 8. These contact members each includes a flat zig-zag strip portion or bus bar 80 having a bent spring member constituting a V-shaped contact 81 at one end. The contacts 81 fit into enlarged portions 82 of recesses 51, 52 formed in the base member. Screws 83 hold the contacts in place in the base member. These contacts and recesses 82 are disposed to reecive prongs 56 of socket 32; see FIG. 3.

Bar 68 is secured in the box 50 by screws 84 inserted through countersunk holes in the box into threaded holes 86 in the ends of the bar. Two spaced threaded holes 88 are formed in the bar and receive roundhead screws 90. These screws are located to exert pressure upon the conductors 74, 75 and press them into contact with the ends 80 of contact members 79; see FIG. 2.

The arrangement of the power outlet is such that the power terminal receptacle 70 is permanently mounted in the box. Installation is quickly made and requires only a screw driver to tighten the various screws. The ends of conductors or cables 74, 75 need not be twisted as is required in conventional power outlet installations. The exposed ends of the wire conductors fit into recesses 69a while the adjacent insulation of the wires fits into recesses 69. The conductors rest on and extend across the ends of the respective bus bars 80 and are held in contact therewith by the pressure of screws 90.

The plug-in socket 32 is installed by inserting the prongs 56 into the block 66 to contact spring fingers 81. Installation of the socket is completed by insertion of screws 49 in the bars 44 and threading the screws in lugs 48. The cover plate 24 can then be attached by threading of screw 95 into the threaded hole 96 provided in the socket; see FIG. 3.

Another form of socket 32a is shown in FIGS. 16–18. This socket has only a single pair of holes 40a in plate 36a to receive a plug of a single appliance. Socket 32 provides a double outlet while socket 32a provides a single outlet. Bars 44a are longer than bars 44 since the socket is disposed for mounting at the center of the box 50. Base block 34a has recesses registered with holes 40a to receive contact fingers 60a formed on contacts 54a. Prongs 56a are integrally formed with the contact fingers as best shown in FIG. 19.

Socket 32 can readily be removed from an outlet by unplugging it from receptacle 70 and socket 32a can be inserted in the receptacle in its place. It will not be necessary to disturb the wires 71, 73 as is necessary in conventional power outlets, so that this change of sockets can be done without interruption to the power supply circuit.

Referring now to the modified form of wall type power outlet device 20' shown in FIGS. 20 to 22, inclusive, in this form the outlet device includes a base 70' constituted by a rectangular-shaped block 100 of insulating material, preferably plastic, having upstanding end walls 102, another similar shaped block 104 of similar material stacked on the base, and a generally rectangular shaped body 14', of similar material, with tapered end and side surfaces, said body being spaced slightly above the intermediate block 104. Perforated end plate lugs 44' extend from the ends of the body 14'. The body and blocks are tied together by screws 106 extending through the perforations in the lugs 44' and aligned holes in the blocks 100 and 104.

The base block 100 is formed with a pair of spaced shallow recesses 110 and 112 adjacent the ends thereof and spaced from the longitudinal center thereof. The recess 110 is lined with a ribbon of metallic conducting material 114 formed with a lateral extension 116, terminating at its free end in an upwardly extending V-shaped terminal member 118, extending above the top surface of the block at one long side thereof. The other recess 112 is similarly lined with a metallic ribbon 120 with a lateral extension 122 terminating in an upstanding V-shaped terminal 124, extending above the top surface of the block at the opposite long side of the block. A pair of conductors 126 and 128 lead into the recesses 110 and 112, respectively, over the surfaces of the ribbons.

A pair of screws 130, 132 is carried by the intermediate block 104 directly over the recesses 110 and 112, respectively. The block 104 constitutes a pressure bar and upon setting up on the screws, the conductors 126 and 128 are engaged by the screws and clamped against the ribbons as seen in FIGS. 21 and 22.

The insulating body 14' is formed with duplex sockets including a pair of transversely disposed spaced recesses 44' at each end thereof and installed in the recesses in each side are spring electrical contacts 60' carried by bus bars similar to the bus bars 54. A metallic conducting plate 134 is mounted flatwise against one side of the body 14' and is secured thereby by screws 136 and 138 which make contact with the bus bars. A finger contact 140 depends from plate 134 and is adapted to be plugged into the terminal 124. A similar conducting plate 142 is similarly mounted on the opposite side of the body 14' and is similarly secured by screws 144. Plate 142 is provided with a depending contact finger 146 adapted to be plugged into the terminal 118 as seen in FIG. 22.

A facing plate 24' finishes off the device and is fastened to the body 14' by means of a screw 150 extending through a hole 152 in the plate and a threaded recess 154 in the body 14'. The plate 24' is formed with a pair of openings 26', 26', to receive the transversely disposed enlarged sections 28' and 30' formed on the top surface of the body 14'.

In FIG. 23, a modified insulating body 14'' is shown wherein only a single pair of sockets 40'' is shown. In this form only a single fastening and contacting screw 134'' is used, and a contact member similar to contact member 54a of FIG. 19 is installed in each recess 40''. This socket is to be used with the base block 70' and block 104 of the form of FIG. 20. The body is provided with supporting bars 44''.

While this invention has been illustrated and described with respect to single and double outlet sockets, it will be readily apparent to those skiled in the art that the invention can be readily adapted to sockets having more than two outlets, to single and multiple switches, and the like.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A power outlet, comprising a box, a power terminal receptacle secured in said box, said receptacle including power wires attached thereto, said receptacle including a base member, contact members in said base member disposed for contact by said wires, said contact members having bodies of zigzag formation with V-shaped contact fingers, said base member having openings receiving said contact fingers and communicating with the exterior of said base member in said box, said wire attachment constituted by a bar secured in said box and having adjustable screws adapted to press said wires into pressure engagement with said contact members, a plug-in socket in said box, said socket having prongs removably inserted in the openings in the base member in contact with said contact fingers, said socket including a base having a plurality of pairs of recesses, contact strips integral with said prongs and having spring fingers inserted in said pairs of recesses, and a plate covering said base and having holes communicating with said recesses to receive prongs of a pair of appliance plugs.

2. In a power outlet device of the kind described, a rectangular-shaped box having top, bottom, rear and side walls and being open at the front, a block inside the box and secured to the rear wall, said block having recesses midway its ends at the side thereof opening forwardly, and having transverse grooves in the front surface thereof between the recesses and the ends of the bolck; bus bars secured to the front surface of the block between the recesses and grooves, said bars having V-shaped contacts at one end thereof seated in said recesses, the other ends of the bars crossing said grooves, power wire cables extending through the opening in said one side wall of the box, said cables being seated in said grooves and disposed across said bus bar ends, an elongated rectangular insulating bar disposed over and along the front suface of the block and closely spaced therefrom, said bar having threaded openings in line with said grooves, set screws in said openings contacting said cables for clamping the cables against the bus bars, a plug-in socket unit including a block having elongated recesses therein along its sides and opening outwardly of the block, said recesses having enlarged portions at the ends and midway the ends thereof, bus bars fitted in said elongated recesses, V-shaped contacts at the ends of the bus bars fitted in the end enlarged portions of the recesses, integral prongs on the bus bars intermediate the ends thereof extending through the middle enlarged portions of the recesses, said prongs extending outwardly of the block, a plate secured to the grooved face of the blocks, said plate having pairs of openings at its ends in line with the contacts in the end enlarged portions of the elongated recesses to receive prongs of an appliance plug, and a cover plate serving as a closure for the front of the box, said cover plate having spaced cutout portions to receive the ends of the first-named plate in exposed condition.

References Cited in the file of this patent

UNITED STATES PATENTS

| | | |
|---|---|---|
| 2,410,287 | Jaberg | Oct. 29, 1946 |
| 2,908,743 | Premoshis | Oct. 13, 1959 |
| 2,920,303 | Johnson | Jan. 5, 1960 |